(12) United States Patent
Heumann et al.

(10) Patent No.: US 7,373,332 B2
(45) Date of Patent: May 13, 2008

(54) METHODS AND APPARATUS FOR DETECTING TEMPORAL PROCESS VARIATION AND FOR MANAGING AND PREDICTING PERFORMANCE OF AUTOMATIC CLASSIFIERS

(75) Inventors: John M. Heumann, Loveland, CO (US); Jonathan Q. Li, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/940,441

(22) Filed: Sep. 14, 2004

(65) Prior Publication Data

US 2006/0074823 A1  Apr. 6, 2006

(51) Int. Cl.
G06E 1/00 (2006.01)
G06E 3/00 (2006.01)
G06F 15/18 (2006.01)
G06G 7/00 (2006.01)

(52) U.S. Cl. .............................. 706/16; 706/20; 706/21

(58) Field of Classification Search ................... 706/16, 706/20, 25, 12; 607/5
See application file for complete search history.

(56) References Cited

U.S. PATENT DOCUMENTS

| | | | | |
|---|---|---|---|---|
| 4,287,766 A | * | 9/1981 | Ensminger | 73/582 |
| 4,641,527 A | * | 2/1987 | Hiroi et al. | 73/582 |
| 4,876,455 A | * | 10/1989 | Sanderson et al. | 250/559.22 |
| 4,988,202 A | * | 1/1991 | Nayar et al. | 356/394 |
| 4,999,499 A | * | 3/1991 | Bhatt | 250/342 |
| 5,335,291 A | * | 8/1994 | Kramer et al. | 382/158 |
| 5,720,003 A | * | 2/1998 | Chiang et al. | 706/21 |
| 5,963,662 A | * | 10/1999 | Vachtsevanos et al. | 382/150 |
| 6,081,796 A | * | 6/2000 | Takagi et al. | 706/1 |
| 6,269,179 B1 | * | 7/2001 | Vachtsevanos et al. | 382/149 |
| 6,487,276 B1 | * | 11/2002 | Rosen et al. | 379/1.04 |
| 6,548,790 B1 | * | 4/2003 | Trucco | 219/605 |
| 6,818,862 B2 | * | 11/2004 | Uetani et al. | 219/229 |
| 6,901,137 B2 | * | 5/2005 | Rosen et al. | 379/1.03 |
| 7,019,826 B2 | * | 3/2006 | Vook et al. | 356/237.1 |
| 7,099,435 B2 | * | 8/2006 | Heumann et al. | 378/58 |
| 7,149,320 B2 | * | 12/2006 | Haykin et al. | 381/320 |
| 7,171,037 B2 | * | 1/2007 | Mahon et al. | 382/145 |

OTHER PUBLICATIONS

G. M. Weiss and H. Hirsh, Learning to Predict Rare Events in Categorical Time-Series Data, 1998, Papers from the 1998 AAAI Workshop—Predicting the Future: AI Approaches to Time-Series Problems, Technical Report WS-98-07, AAAI Press, pp. 83-90.*
A tiered-color illumination approach for machine inspection of solder joints Capson, D.W.; Eng, S.-K.; Pattern Analysis and Machine Intelligence, IEEE Transactions on vol. 10, Issue 3, May 1988 pp. 387-393 Digital Object Identifier 10.1109/34.3902.*

(Continued)

*Primary Examiner*—Michael B. Holmes

(57) ABSTRACT

Techniques for detecting temporal process variation and for managing and predicting performance of automatic classifiers applied to such processes using performance estimates based on temporal ordering of the samples are presented.

8 Claims, 12 Drawing Sheets

OTHER PUBLICATIONS

Automatic visual solder joint inspection Besl, P.; Delp, E.; Jain, R.; Robotics and Automation, IEEE Journal of [legacy, pre—1988] vol. 1, Issue 1, Mar. 1985 pp. 42-56.*

Automatic visual inspection of solder joints Besl, P.; Delp, E.; Jain, R.; Robotics and Automation. Proceedings. 1985 IEEE International Conference on vol. 2, Mar. 1985 pp. 467-473.*

Defect free assembly of SMT devices Desai, H.; Electrical Insulation Conference, 1997, and Electrical Manufacturing & Coil Winding Conference. Proceedings Sep. 22-25, 1997 pp. 677-682 Digital Object Identifier 10.1109/EEIC.1997.651278.*

* cited by examiner

*PRIOR ART*

METHODS AND APPARATUS FOR DETECTING TEMPORAL PROCESS VARIATION AND FOR MANAGING AND PREDICTING PERFORMANCE OF AUTOMATIC CLASSIFIERS

BACKGROUND OF THE INVENTION

Many industrial applications that rely on pattern recognition and/or the classification of objects, such as automated manufacturing inspection or sorting systems, utilize supervised learning techniques. A supervised learning system, as represented in FIG. 1, is a system that utilizes a supervised learning algorithm 4 to create a trained classifier 6 based on a representative input set of labeled training data 2. Each member of the set of training data 2 consists of a vector of features, $x_i$, and a label indicating the unique class, $c_i$, to which the particular member belongs. Given a feature vector, x, the trained classifier, f, will return a corresponding class label, $f(x)=\hat{c}$. The goal of the supervised learning system 4 is to maximize the accuracy or related measures of the classifier 6, not on the training data 2, but rather on similarly obtained set(s) of testing data that are not made available to the learning algorithm 4. If the set of class labels for a particular application contains just two entries, the application is referred to as a binary (or two-class) classification problem. Binary classification problems are common in automated inspection, for example, where the goal is often to determine if manufactured items are good or bad. Multi-class problems are also encountered, for example, in sorting items into one or more sub-categories (e.g., fish by species, computer memory by speed, etc.). Supervised learning has been widely studied in statistical pattern recognition, and a variety of learning algorithms and methods for training classifiers and predicting performance of the trained classifier on unseen testing data are well known.

Referring again to FIG. 1, given a labeled training data set 2 (D={$x_i$, $c_i$}), a supervised learning algorithm 4 can be used to produce a trained classifier 6 ($f(x)=\hat{c}$). A risk or cost, $\alpha_{ij}$, can be associated with mistakenly classifying a sample as belonging to class i when the true class is j. Traditionally, correct classification is assigned zero cost, $\alpha_{ii}=0$. A typical goal is to estimate and minimize the expected loss, namely the weighted average of the costs the classifier 6 would be expected to incur on new samples drawn from the same process. The concept of loss is quite general. Setting $\alpha_{ij}=1$ when i and j differ, and $\alpha_{ii}=0$ when they are identical (so-called zero/one loss) is equivalent to treating all errors as equal and leads to minimization of the overall misclassification rate. More typically, different types of errors will have different associated costs. More complicated loss formulations are also possible. For example, the losses au can be functions rather than constants. In every case, however, some measure of predicted classifier performance is defined, and the goal is to maximize that performance, or, equivalently, to minimize loss.

There are several prior art techniques for predicting classifier performance. One such technique is to use independent training and testing data sets. A trained classifier is constructed using the training data, and then performance of the trained classifier is evaluated based on the independent testing data. In many applications, collection of labeled data is difficult and expensive, however, so it is desirable to use all available data during training to maximize accuracy of the resulting classifier.

Another prior art technique for predicting classifier performance known as "conventional k-fold cross-validation", or simply "k-fold cross-validation" avoids the need for separate testing data, allowing all available data to be used for training. In k-fold cross-validation, as illustrated in FIGS. 2A and 2B, the training data {$x_i$, $c_i$} are split at random into a k subsets, $D_i$, $1 \leq i \leq k$, of approximately equal size (FIG. 2B, step 11). For iterations i=1 to k (steps 12-17), a supervised learning algorithm is used to train a classifier (step 14) using all the available data except $D_i$. This trained classifier is then used to classify all the samples in subset $D_i$ (step 15), and the classified results are stored (step 16). In many cases, summary statistics can also be saved (at step 16) instead of individual classifications. With constant losses, for example, it suffices to save the total number of errors of various types. After k iterations, true ($c_i$) and estimated ($\hat{c}_i$) class labels (or corresponding sufficient statistics) are known for the entire data set. Performance estimates such as misclassification rate, operating characteristic curves, or expected loss may then be computed (step 18). If the total number of samples is n, then the expected loss per sample can be estimated as $\Sigma \alpha_{\hat{c}_i c_i}/n$, for example. When k=n−1, k-fold cross-validation is also known as "leave-one-out cross-validation". A computationally more efficient variant known as "generalized cross-validation" may be preferred in some applications. Herein we refer to these and similar prior art techniques as "conventional cross validation" without differentiating between them.

In k-fold cross-validation, data samples are used to estimate performance only when they do not contribute to training of the classifier, resulting in a fair estimate of performance. Additionally, for large enough k, the training set size (approximately (k−1)/k·n, where n is the number of labeled training data samples) during each iteration above is only slightly less than that of the full data set, leading to only mildly pessimistic estimates of performance.

Many supervised learning algorithms lead to classifiers with one or more adjustable parameters controlling the operating point. For simplicity, discussion is herein restricted to binary classification problems, where $c_i$ is a member of one or the other of two different classes. However, it will be appreciated that the principles discussed herein may be extended to multiple-class classification problems. In a binary classification, a false positive is defined as mistakenly classifying a sample as belonging to the positive (or defect) class when it actually belongs to the negative (or good) class. Similarly, a true positive is defined as correctly classifying a sample as belonging to the positive class. False positive rate (also known as false alarm rate) may then be defined as the number of false positives divided by the number of members of the negative class. Similarly, sensitivity is defined as the number of true positives divided by the number of members of the positive class. With these definitions, performance of a binary classifier with an adjustable operating point can be summarized by an operating characteristic curve, sometimes called a receiver operating characteristic (ROC) curve, exemplified by FIG. 3. Varying the classifier operating point is equivalent to choosing a point lying on the ROC curve. At each operating point, estimates of the rates at which misclassifications of either type occurs are known. If the associated costs, $\alpha_{ij}$, are also known, an expected loss can be computed for any operating point. For monotonic operating characteristics, a unique operating point that minimizes expected loss can be chosen. As noted above, k-fold cross-validation provides the information required to construct an estimated ROC curve for binary classifiers.

In addition to making effective use of all available data, k-fold cross-validation has the additional advantage that it also allows estimating reliability of the predicted performance. The k-fold cross-validation algorithm can be repeated with a different pseudo-random segregation of the data into the k subsets. This approach can be used, for example, to compute not just the expected loss, but also the standard deviation of this estimate. Similarly, non-parametric hypothesis testing can be performed (for example, k-fold cross-validation can be used to answer questions such as "how likely is the loss to exceed twice the estimated value?").

Prior art methods for predicting classifier performance assume that the set of training data is representative. If it is not, and in particular if the process giving rise to the training data samples is characterized by temporal variation (e.g., the process drifts or changes with time), then the trained classifier may perform much more poorly than predicted. Such discrepancies or changes in performance can be used to detect temporal variation when it occurs, but it would be preferable to detect temporal variation in the process during the training phase. Supervised learning does not typically address this problem.

Two techniques that do explicitly deal with the prediction of temporal variation in a process are time series analysis and statistical process control. Time series analysis attempts to understand and model temporal variations in a data set, typically with the goal of either predicting behavior for some period into the future, or correcting for seasonal or other variations. Statistical process control (SPC) provides techniques to keep a process operating within acceptable limits and for raising alarms when unable to do so. Ideally, statistical process control could be used to keep a process at or near its optimal operating point, almost eliminating poor classifier performance due to temporal variation in the underlying process. In practice, this ideal is rarely approached because of the time, cost, and difficulty involved. As a result, temporal variation may exist within predefined limits even in well controlled processes, and this variation may be sufficient to interfere with the performance of a classifier created using supervised learning. Neither time series analysis nor statistical process control provides tools directly applicable for analysis and management of such classifiers in the presence of temporal process variation.

Prior art methods for predicting classifier performance are applicable when either a) the underlying process which generated the set of training data has no significant temporal variation, or b) temporal variation is present, but the underlying process is stationary and ergodic, and samples are collected over a long enough period that they are representative. In many cases where there is explicit or implicit temporal variation in the underlying process the assumption that the set of training data is representative of the underlying process is not justified, and k-fold cross-validation can dramatically overestimate performance. Consider, for example, the processes illustrated in FIGS. 4A, 4B, and 4C. "State" in these figures is meant only for purposes of illustration. The actual state will be of high, often unknown dimension and is itself rarely known. The process illustrated in FIG. 4A has no temporal variation. The process illustrated in FIG. 4B is a stationary process with random, ergodic fluctuations. The process illustrated in FIG. 4C shows steady drift accompanied by random fluctuations about the local mean. Conventional k-fold cross-validation will correctly predict classifier performance for the process illustrated in FIG. 4A given sufficient training data. For the process illustrated in FIG. 4B, correct results will also be attained if the data set is collected over a sufficiently long period so that states are sampled with approximately the equilibrium distribution. Failing this, performance will typically be overestimated. For the process illustrated in FIG. 4C, actual performance may match predicted performance initially, but will degrade as points further into the future are sampled. This list of sample processes is for purposes of illustration only and is by no means exhaustive.

The determination of whether the set of training data is representative of the process often requires the collection of additional labeled training data, which can be prohibitively expensive. As an example, consider fabrication of complex printed circuit assemblies. Using SPC, individual solder joints on such printed circuit assemblies may be formed with high reliability, e.g. with defect rates on the order of 100 parts-per-million (ppm). Defective joints may therefore be quite rare. Large printed circuit assemblies can exceed 50,000 joints, however, so the economic impact of defects would be enormous without the ability to automatically detect joints that are in need of repair. Supervised learning is often used to construct classifiers for this application. Thousands of defects are desirable for training, but since good joints outnumber bad joints by 10,000 to 1, millions of good joints must be examined in order to obtain sufficient defect samples for training the classifier. This poses a significant burden on the analyzer (typically a human expert) tasked with assigning true class labels, so collection of training data is time-consuming, expensive, and error prone. In addition, the collection of more training data than necessary slows the training process without improving performance. Accordingly, it is desirable to use the smallest training data set possible that yields the desired performance.

For the reasons described above, it would be desirable to be able to detect the presence or possible presence of temporal variation in the process from indications in the training data itself. It would be further desirable to be able to predict expected future classifier performance even in the presence of temporal variation in the underlying process. Finally, it would be useful to project the performance gain likely to result from collection of additional training data, and for exploring various options for its use (for example, to answer the question of whether it would be better to simply add to the existing training data or to periodically retrain the classifier based on a sliding window of training data samples).

SUMMARY OF THE INVENTION

The present invention provides techniques for detecting temporal process variation and for managing and predicting performance of automatic classifiers applied to such processes using performance estimates based on temporal ordering of the samples. In particular, the invention details methods for detecting the presence, or possible presence, of temporal variation in a process based on labeled training data, for predicting performance of classifiers trained using a supervised learning algorithm in the presence of such temporal variation, and for exploring scenarios involving collection and optimal utilization of additional training. The techniques described can also be extended to handle multiple sources of temporal variation.

A first aspect of the invention involves the detection of temporal variation in a process from indications in resulting process samples which are used as labeled training data for training a classifier by means of supervised learning. According to this first aspect of the invention, the method includes the steps of: choosing one or more first teaching subsets of the labeled training data according to one or more first criteria and corresponding first testing subsets of the labeled training data according to one or more second criteria, wherein at least one of the one or more first criteria and the one or more second criteria are based at least in part on temporal ordering; training one or more first classifiers using the corresponding one or more first teaching subsets respectively; classifying members of the one or more first testing subsets using the corresponding one or more first classifiers respectively; comparing classifications assigned to members of the one or more first testing subsets to corresponding true classifications of corresponding members in the labeled training data to generate one or more first performance estimates based on results of the comparison; choosing one or more second teaching subsets of the labeled training data according to one or more third criteria, and corresponding second testing subsets of the labeled training data according to one or more fourth criteria, wherein at least one of the third criteria differ at least in part from the first criteria and/or at least one of the fourth criteria differ at least in part from the second criteria; training one or more second classifiers using the corresponding one or more second teaching subsets respectively; classifying members of the one or more second testing subsets using the corresponding one or more second classifiers respectively; comparing classifications assigned to members of the one or more second testing subsets to corresponding true classifications of corresponding members in the labeled training data to generate one or more second performance estimates based on results of the comparison; and analyzing the one or more first and the one or more second performance estimates to detect evidence of temporal variation.

Detection of temporal variation in the process may also be performed according to the steps of: performing time-ordered k-fold cross-validation on one or more first subsets of the training data to generate one or more first performance estimates; performing k-fold cross-validation on one or more second subsets of the training data to generate one or more second performance estimates; and analyzing the one or more first performance estimates and the one or more second performance estimates to detect evidence of temporal variation.

A second aspect of the invention involves predicting performance of a classifier trained on a set of labeled training data. According to this second aspect of the invention, the method includes the steps of: choosing one or more first teaching subsets of the labeled training data according to one or more first criteria and corresponding first testing subsets of the labeled training data according to one or more second criteria, wherein at least one of the one or more first criteria and the one or more second criteria are based at least in part on temporal ordering; training one or more first classifiers using the corresponding one or more first teaching subsets respectively; classifying members of the one or more first testing subsets using the corresponding one or more first classifiers respectively; comparing classifications assigned to members of the one or more first testing subsets to corresponding true classifications of corresponding members in the labeled training data to generate one or more first performance estimates based on results of the comparison; choosing one or more second teaching subsets of the labeled training data according to one or more third criteria, and corresponding second testing subsets of the labeled training data according to one or more fourth criteria, wherein at least one of the third criteria differ at least in part from the first criteria and/or at least one of the fourth criteria differ at least in part from the second criteria; training one or more second classifiers using the corresponding one or more second teaching subsets respectively; classifying members of the one or more second testing subsets using the corresponding one or more second classifiers respectively; comparing classifications assigned to members of the one or more second testing subsets to corresponding true classifications of corresponding members in the labeled training data to generate one or more second performance estimates based on results of the comparison; and predicting performance of the classifier based on statistical analysis of the first performance estimates and the second performance estimates.

Classifier performance prediction may also be performed according to the steps of: performing time-ordered k-fold cross-validation on one or more first subsets of the training data to generate one or more first performance estimates; performing k-fold cross-validation on one or more second subsets of the training data to generate one or more second performance estimates; and performing statistical analysis on the one or more first performance estimates and the one or more second performance estimates to predict performance of the classifier.

Alternatively, classifier performance prediction may also be performance according to the steps of: choosing one or more teaching subsets of the labeled training data according to one or more first criteria and corresponding testing subsets of the labeled training data according to one or more second criteria, wherein at least one of the one or more first criteria and the one or more second criteria are based at least in part on temporal ordering; training corresponding one or more classifiers using the one or more teaching subsets respectively; classifying members of the one or more testing subsets using the corresponding one or more classifiers respectively; comparing classifications assigned to members of the one or more testing subsets to corresponding true classifications of corresponding members in the labeled training data to generate one or more performance estimates based on results of the comparison; and predicting performance of the classifier based on statistical analysis of the one or more performance estimates.

A third aspect of the invention involves predicting impact on classifier performance due to varying the training data set size. According to this third aspect of the invention, the method includes the steps of: choosing a plurality of training subsets of varying size and corresponding testing subsets from the labeled training data; training a plurality of classifiers on the training subsets; classifying members of the testing subsets using the corresponding classifiers; and comparing classifications assigned to members of the testing subsets to corresponding true classifications of corresponding members in the labeled training data to generate performance estimates as a function of training set size.

Classifier performance prediction due to varying the training data set size may also be performed according to the steps of: performing time-ordered k-fold cross validation with varying k on the training data; and interpolating or extrapolating the resulting performance estimates to the desired training set size.

A fourth aspect of the invention involves predicting performance of a classifier trained using a sliding window into a training data set. According to this fourth aspect of the invention, the method includes the steps of: sorting the training data set into a sorted training data set according to one or more first criteria based at least in part on temporal ordering; choosing one or more teaching subsets of approximately equal first predetermined size comprising first adjacent members of the sorted training data set and corresponding one or more testing subsets of approximately equal second predetermined size comprising at least one member from the sorted training data set that is temporally subsequent to all members of its corresponding one or more teaching subsets; training corresponding one or more classifiers using the one or more teaching subsets; classifying members of the corresponding one or more testing subsets using the corresponding one or more classifiers; comparing classifications assigned to members of the corresponding one or more testing subsets to corresponding true classifications assigned to corresponding members in the labeled training data to generate one or more performance estimates; and predicting performance of the classifier trained using with a sliding window into the training data of approximately the first predetermined size based on statistical analysis of the one or more performance estimates.

Classifier performance prediction due to a sliding window approach to training may also be performed according to the steps of: choosing one or more groups of the training data set according to one or more first criteria based at least in part on temporal ordering, the one or more groups being of approximately equal size; from each of the one or more groups, choosing one or more teaching subsets of approximately equal first predetermined size according to one or more second criteria based at least in part on temporal ordering and corresponding testing subsets of approximately equal first predetermined size according to one or more third criteria based at least in part on temporal ordering; training corresponding one or more classifiers using the one or more teaching subsets from each of the one or more groups; classifying members of the corresponding one or more testing subsets using the corresponding one or more classifiers; comparing classifications assigned to members of the corresponding one or more testing subsets to corresponding true classifications assigned to corresponding members in the labeled training data to generate one or more performance estimates associated with each group; and predicting performance of the classifier trained using with a sliding window of approximately the first predetermined size into the training data based on statistical analysis of the one or more performance estimates associated with each group.

The above-described method(s) are preferably performed using a computer hardware system that implements the functionality and/or software that includes program instructions which tangibly embody the described method(s).

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

The present invention provides techniques for detecting the presence or possible presence of temporal variation in a process from indications in training data used to train a classifier by means of supervised learning. The present invention also provides techniques for predicting expected future performance of the classifier in the presence of temporal variation in the underlying process, and for exploring various options for optimizing use of additional labeled training data if and when collected. The invention employs a novel technique referred to herein as "time-ordered k-fold cross-validation", and compares performance estimates obtained using conventional k-fold cross-validation with those obtained using time-ordered k-fold cross-validation to detect possible indications of temporal variation in the underlying process.

Figure 5A:
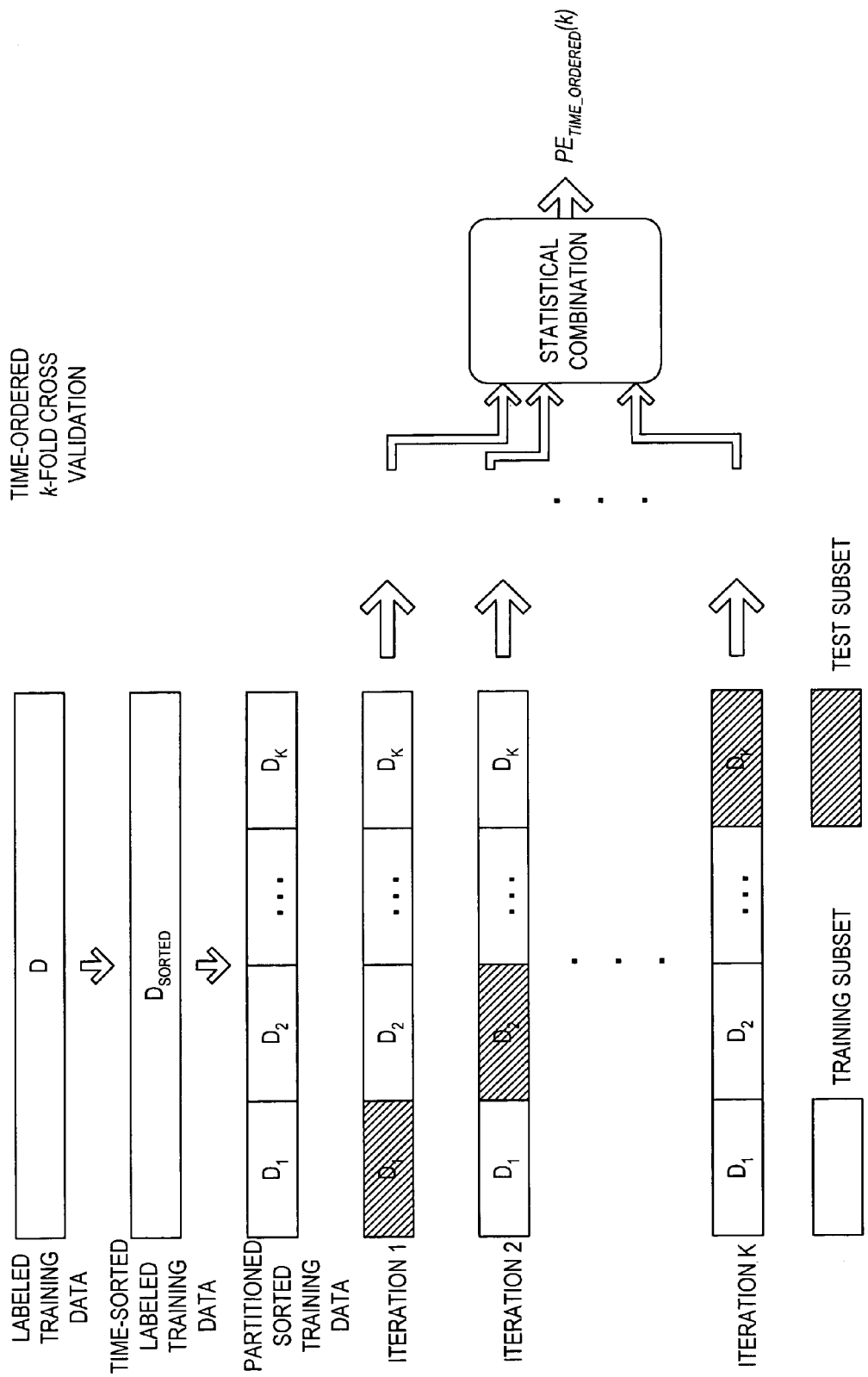
FIG. 5A is a data flow diagram illustrating time-ordered k-fold cross-validation.
Figure 5B:
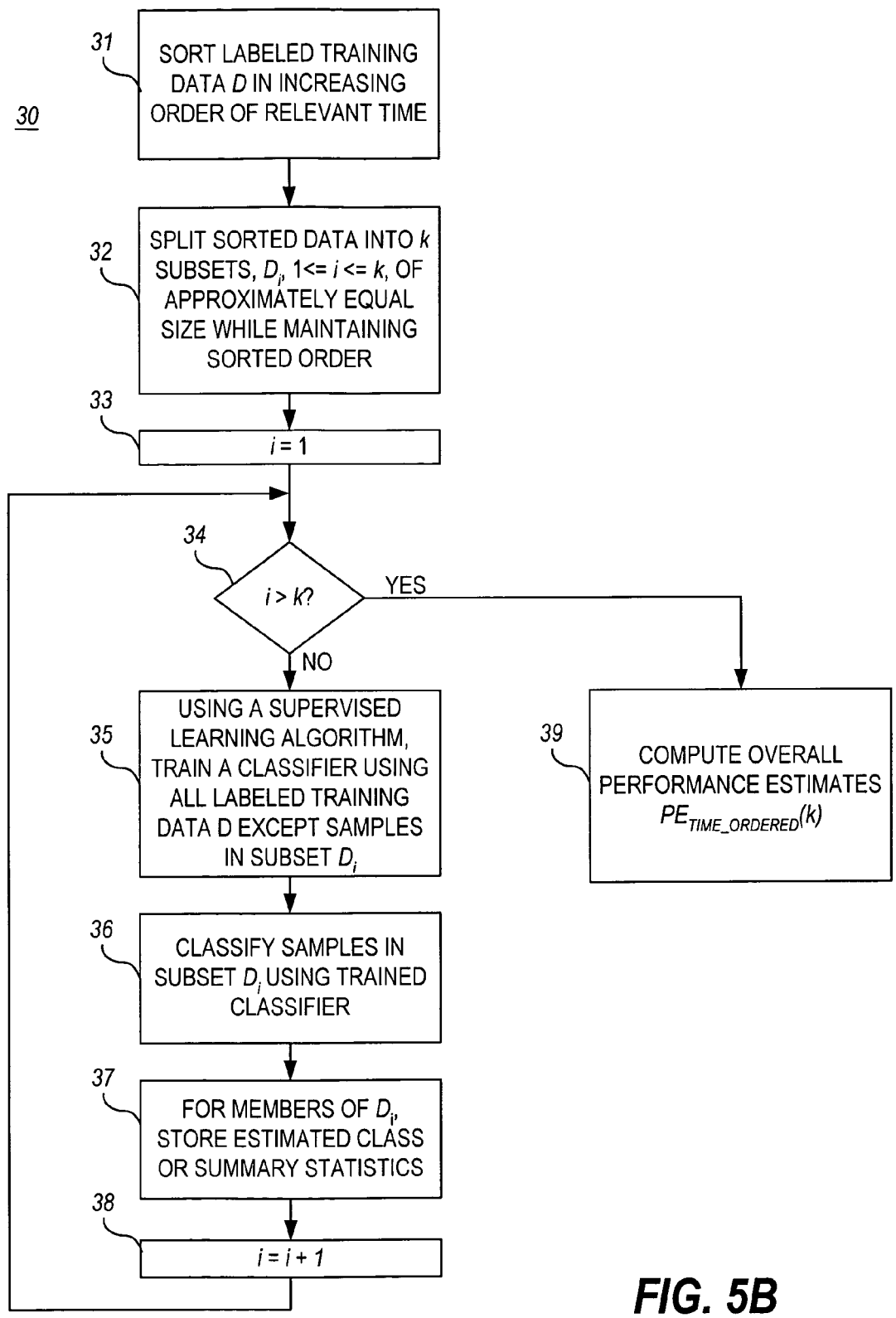
FIG. 5B is a flowchart illustrating a time-ordered k-fold cross-validation algorithm implemented in accordance with the invention.

Time-ordered k-fold cross-validation, as represented in the diagram of FIGS. 5A and 5B, differs from conventional k-fold cross-validation in that the division of the set of labeled training data ($D=\{x_i, c_i\}$) into k subsets is not done at random. Instead, training data are first sorted in increasing order of time (FIG. 5B step 31) according to one or more relevant criteria (e.g., time of arrival, time of inspection, time of manufacture, etc.). The set of sorted training data ($D_{SORTED}$) is then divided (maintaining the time-sorted order) into k subsets $D_1, D_2, \ldots, D_k$ having (approximately) equal numbers of samples (step 32).

The remainder of the process matches that for conventional k-fold cross-validation. For each of i=1 ... k, a classifier is trained on the training data with $D_i$ omitted, and the resulting classifier used to generate estimated class labels $\hat{c}_i$ for members of $D_i$ (steps 33-38). Finally, the predicted performance $PE_{TIME\_ORDERED}(k)$ is computed from the true and estimated class labels, or corresponding summary statistics. As previously, one or more standard measures of performance such as expected loss, misclassification rates, and operating characteristic curves may be computed. As in conventional k-fold cross-validation, all samples in the data set are utilized for both training and testing.

Figure 6:
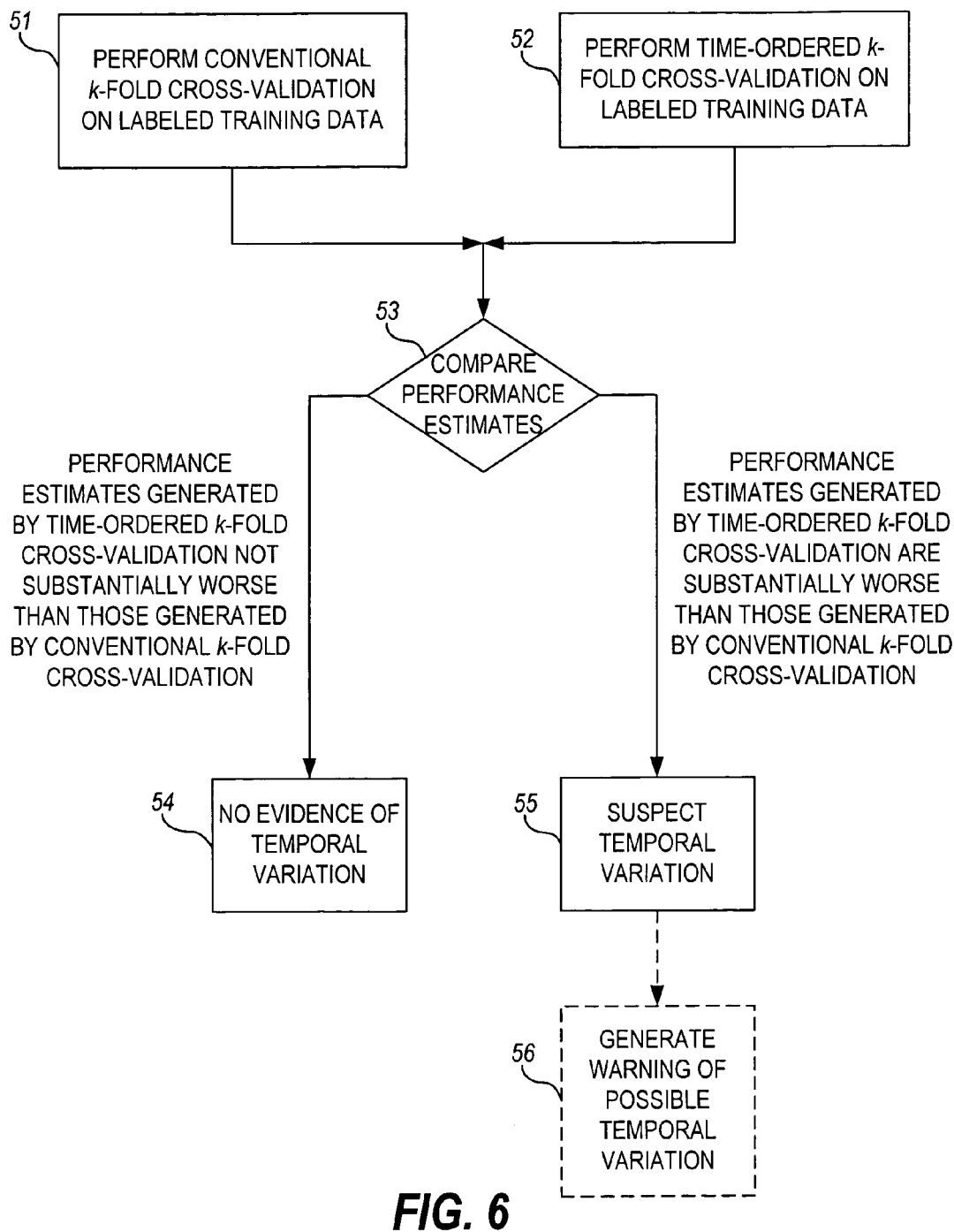
FIG. 6 is a flowchart illustrating the inventive technique of detecting temporal variation in a process based on the training data used to train the classifier.

It has been typically observed that in processes where conventional and time-sorted predictions of performance are different, the time-sorted performance estimate $PE_{TIME\_ORDERED}(k)$ typically provides a much better prediction of future classifier performance than the conventional k-fold cross-validation performance estimates PE(k). According to one aspect of the invention, a method for detecting the possible presence of temporal variation in the underlying process makes use of this fact by comparing performance estimates obtained through conventional and time-ordered k-fold cross-validation. More particularly, the invention follows a method such as 50 shown in FIG. 6, which performs both conventional k-fold cross-validation (step 51) and time-ordered k-fold cross-validation (step 52) on the labeled training data. The performance estimates generated according to the two techniques are compared in step 53. If the performance estimated by time-ordered k-fold cross-validation is not substantially worse than that estimated by conventional k-fold cross-validation, then conventional k-fold cross-validation is used as an accurate predictor of future performance of the classifiers (step 54), and no evidence for temporal variation is found. I.e. either temporal variation is absent on the time scale over which the training samples were collected, or, if present, the process appears stationary and ergodic with training samples collected over a long enough period that they are representative.

If, however, the performance estimate based on time-ordered k-fold cross-validation is substantially worse (step 55), a warning is optionally generated (step 56) indicating the possibility of temporal variation in the underlying process and that further analysis is warranted. Additionally, the time-ordered k-fold cross-validation performance estimate provides a better short term predictor of future classifier performance than does the conventional k-fold cross-validation performance estimate under these conditions.

In another aspect of the invention, when temporal variation is detected, further analysis is conducted, either automatically or under manual user control, to predict what improvement in performance might be obtained by collecting additional training data. Specifically, a graph of training set size versus predicted performance is constructed. Additionally, analyses are conducted to determined whether better performance would result from combining newly acquired training data with that previously collected, or from use of a sliding window of given size with ongoing training data acquisition.

Figure 7:
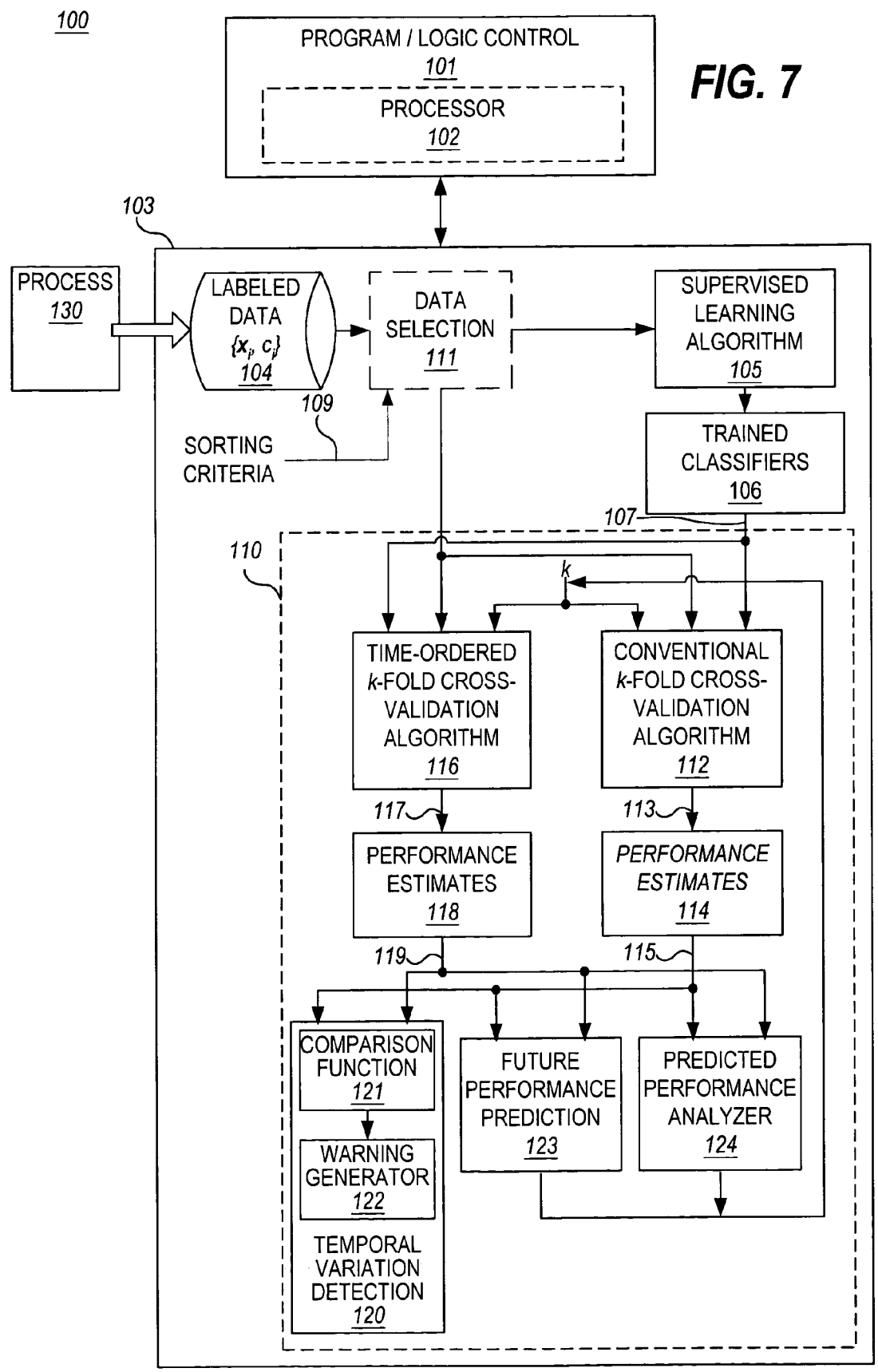
FIG. 7 is a block diagram of a system implementing a temporal variation manager implemented in accordance with the invention.

FIG. 7 is a block diagram of a system 100 implemented in accordance with the invention. System 100 detects possible temporal variations in a process 130 generating a set of labeled training data 104, and predicts future performance of a classifier trained on data set 104 using supervised learning algorithm 105. Additionally, system 100 makes recommendations as to whether to collect additional training data, and if so, how to make use of it. The system 100 generally includes program and/or logic control 101 (e.g., a processor 102) that executes code (i.e., a plurality of program instructions) residing in memory 103 that implements the functionality of the invention. In particular, the memory 103 preferably includes code implementing a supervised learning algorithm 105, classifiers 106, a temporal variation manager 110, and a data selection module 111.

Figures 1, 2B:
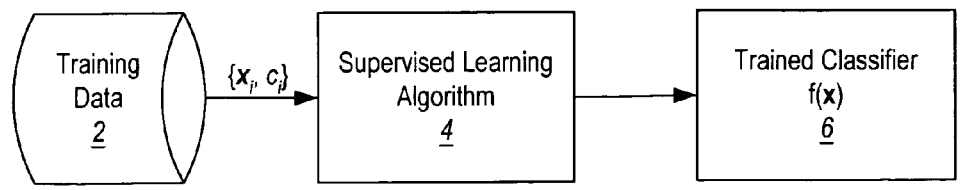
FIG. 1 is a block diagram of a conventional supervised learning system.
FIG. 2B is a flowchart illustrating a conventional k-fold cross-validation algorithm.
Figure 2A:
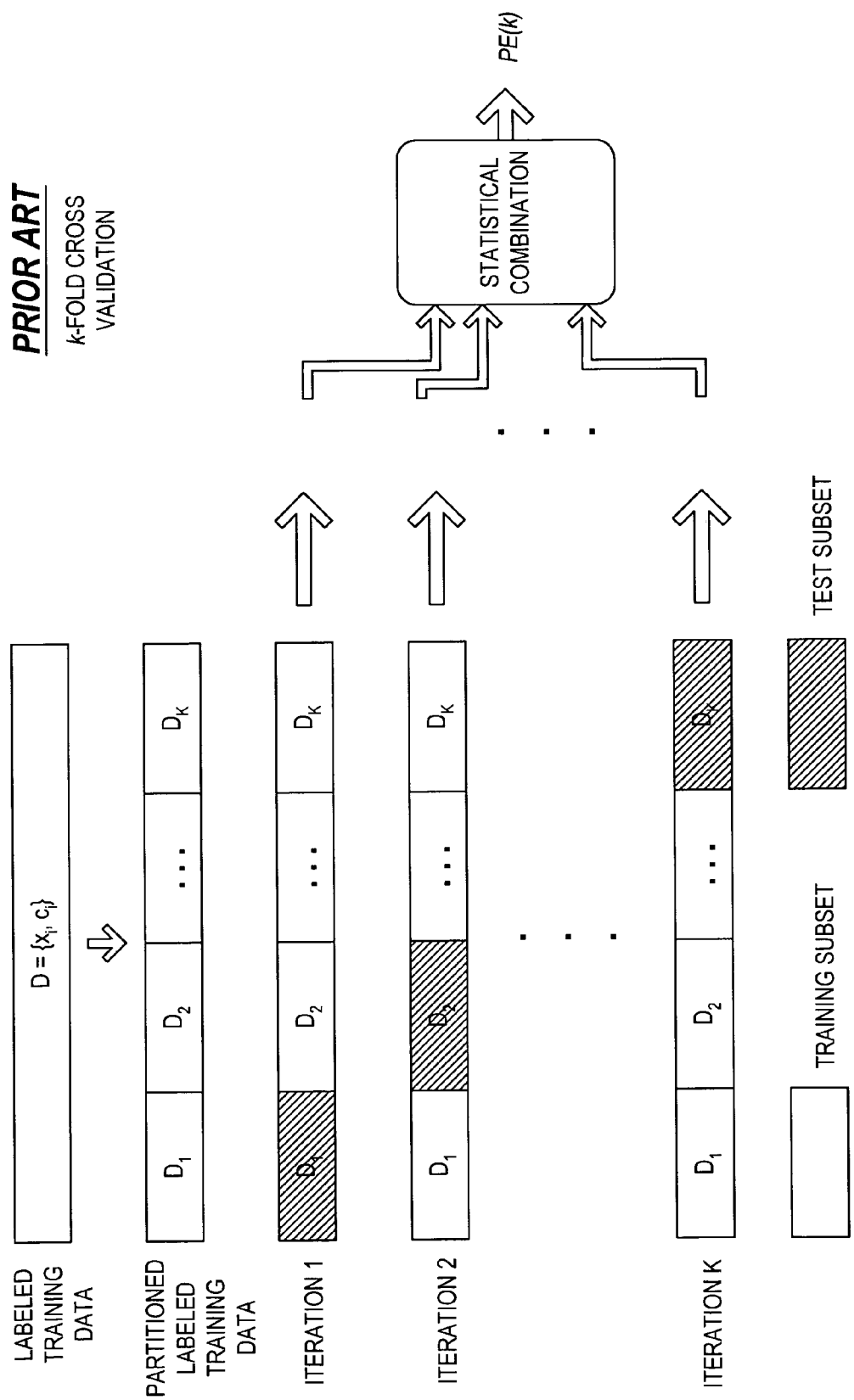
FIG. 2A is a data flow diagram illustrating conventional k-fold cross-validation.
Figure 3:
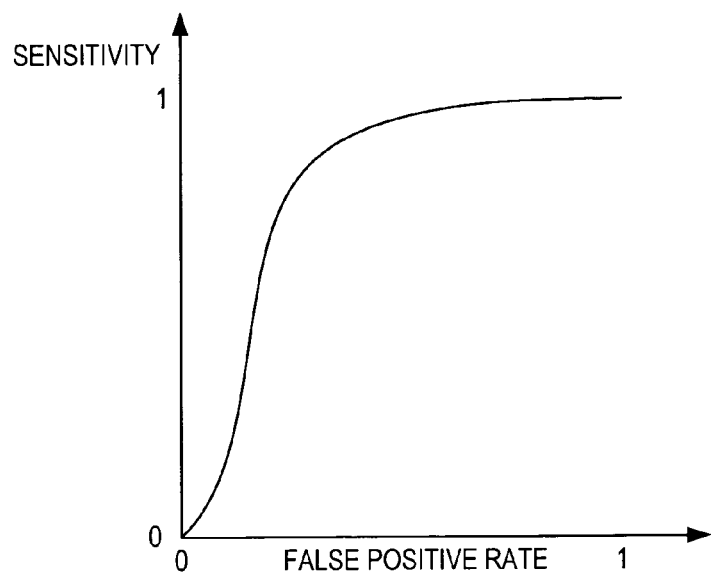
FIG. 3 is a graph illustrating an example of a receiver operating characteristic (ROC) curve.
Figure 4A:
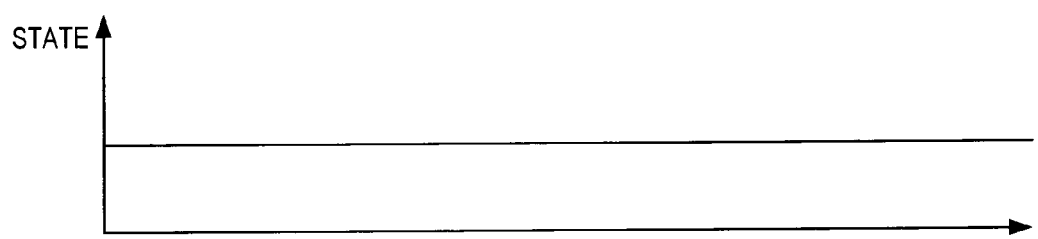
FIG. 4A is graph illustrating an example process plotted over time with no temporal variation.
Figure 4B:
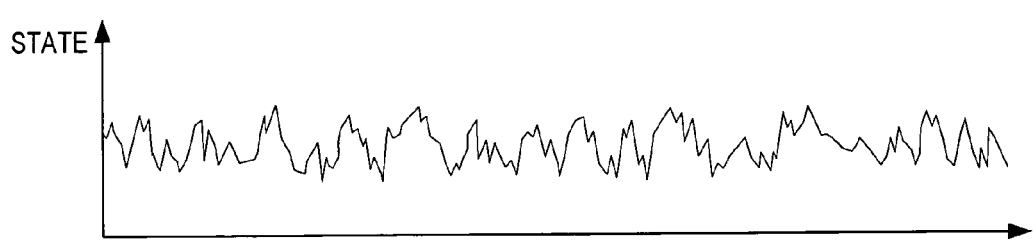
FIG. 4B is graph illustrating an example stationary process plotted over time with random, ergodic fluctuations.
Figure 4C:
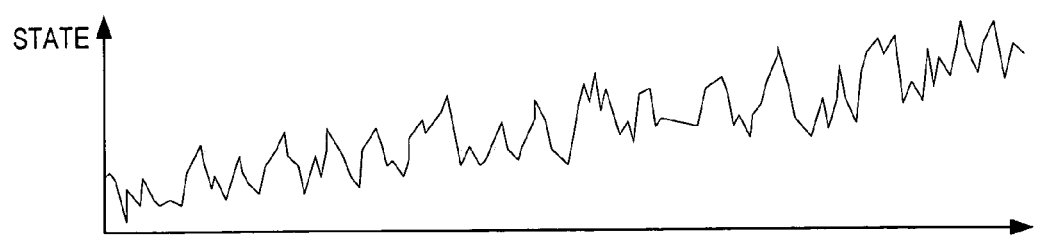
FIG. 4C is graph illustrating an example process plotted over time with steady drift accompanied by random fluctuations about the mean.

The supervised learning algorithm 105 constructs trained classifiers 106 using some or all of training data 104, as selected by data selection module 111. Data selection module 111 is also capable of sorting the data according to specified criteria 109 in addition to choosing subsets of either the sorted or original data in deterministic or pseudo-random fashion under program control. Time-ordered and conventional k-fold cross-validation algorithms are implemented by modules 116 and 112, respectively. Performance estimates generated by these modules 118 and 114 are identical to those which would be generated by the algorithms of FIGS. 5B and 2B, respectively, and the modules 116 and 112 may therefore be considered logically distinct, as illustrated. In the preferred embodiment, however, all sorting, subset selection and partitioning is actually performed by data selection module 111, so 116 and 112 are actually implemented as a single, shared k-fold cross-validation module which expects the data to have been split into k subsets in advance. As in FIGS. 5B and 2B, the cross-validation module uses learning algorithm 105 to construct trained classifiers 106, which are in turn used to generate estimated classifications $\hat{c}_i$ for each input vector $x_i$. Time-sorted and conventional performance estimates 118 and 114 are then derived by comparing the true and expected classification sets $\{c_i\}$ and $\{\hat{c}_i\}$ or corresponding summary statistics. In the preferred embodiment, expected loss is used as the common performance estimate. Temporal variation manager 110 constructs ROC curves from summary statistics derived from both time-ordered and conventional k-fold cross-validation, and chooses operating points for each to minimize expected per-sample loss.

The temporal variation manager 110 also includes a temporal variation detection function 120, and preferably a future performance prediction function 123 and a predicted performance analyzer 124.

The temporal variation detection function 120 of the temporal variation manager 110 includes a comparison function 121 that compares the conventional k-fold cross-validation performance estimates 113 with the time-ordered k-fold cross-validation performance estimates 117 to determine the possible presence of temporal variation in the underlying process. In the preferred embodiment, the comparison function 120 compares the expected losses 115 and 119 calculated respectively from the conventional k-fold cross-validation performance estimates 113 and from the time-ordered k-fold cross-validation performance estimates 117 at the respective operating points of the respective ROC curves which minimizes the respective expected loss per sample. Accordingly, in the preferred embodiment the comparison function 120 determines whether the expected loss per sample 119 computed using time-ordered k-fold cross-validation is substantially greater (within a reasonable margin of error) than the expected loss per sample 115 predicted using ordinary conventional k-fold cross-validation. (For non-binary cases, higher dimensional surfaces are generated instead of ROC curves; however, an optimal operating point and an associated expected loss still exist which can be calculated and compared.)

If the time-ordered k-fold cross-validation performance estimates 117 are comparable to or better than the conventional k-fold cross-validation performance estimates 113, then there is no evidence of uncontrolled temporal variation, and conventional k-fold cross-validation provides an appropriate prediction of performance 123. If, on the other hand, the performance predicted by time-ordered k-fold cross-validation is substantially worse than that predicted by conventional k-fold cross-validation, then temporal variation is suggested, and conventional k-fold cross-validation method may therefore overestimate performance of a classifier trained using all of the currently available training data 104. In this case, warning generation 122 preferably generates a warning indicating the possible existence of temporal variation in the underlying process. The warning may be generated in many different ways, including the setting of a bit or value in a designated register or memory location, the generation of an interrupt by the processor 102, the return of a parameter from a procedure call, the call of a method or procedure that generates a warning (for example in a graphical user interface or as an external signal), or any other known computerized method for signaling a status. Additionally, predicted performance 123 will be based on per sample predicted loss estimated by time-sorted cross-validation in this case.

One method for determining whether the performance predicted by time-ordered k-fold cross-validation 114 is "substantially worse" than that predicted by conventional k-fold cross-validation 112 is as follows: Since the time-ordered grouping is unique, the time-ordered grouping cannot be re-sampled to estimate variability of the estimate in the manner typically used in ordinary cross-validation. Since the conventional k-fold cross-validation grouping is randomly chosen, however, one can test the null hypothesis that the difference between the time-sorted and conventional estimates is due to random variation in the conventional k-fold cross-validation estimate. If, in repeated applications of conventional k-fold cross-validation, the estimated performance is worse than that obtained by time-ordered k-fold cross-validation p % of the time, then the difference is likely to be significant if p, the achieved significance level, is small.

Other methods for estimating variability of the performance estimates and deciding whether they differ substantially may also be used. For example, comparison between the conventional and time-ordered performance estimates can be done without repeating the conventional k-fold cross-validation. For both conventional and time-ordered k-fold cross-validation, performance estimates can be computed individually on each of the k evaluation subsets or combinations thereof. The variability of these estimates (e.g. a standard deviation or a range) within each type of cross-validation may then be used as a confidence measure for the corresponding overall performance estimate. Conventional statistical tests may then be applied to determine whether the estimates are significantly different or not.

Figure 8:
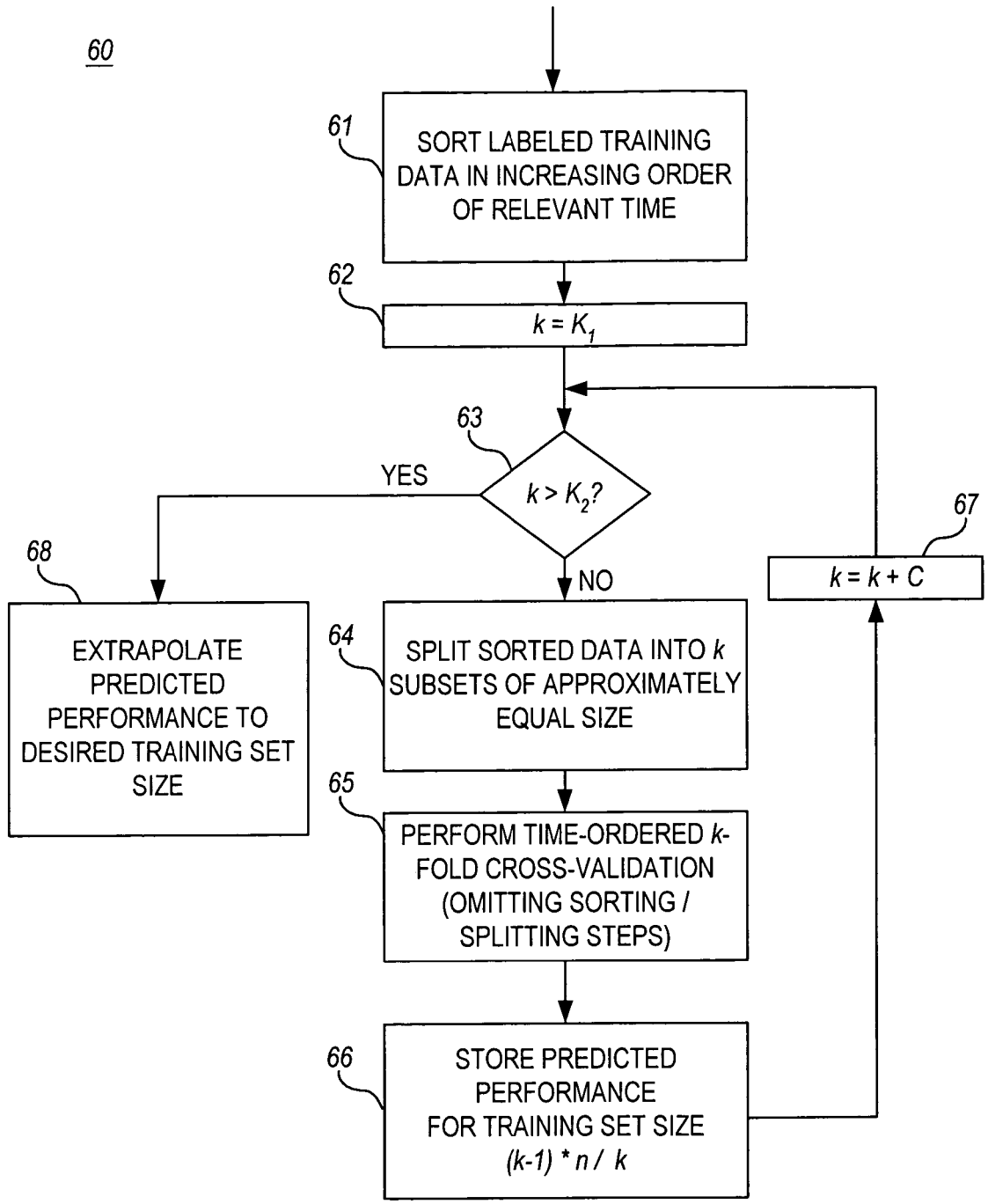
FIG. 8 is a flowchart illustrating a method of operation for predicting future performance of a classifier.

Since collecting additional training data is potentially expensive, it would be desirable to predict, prior to actual collection, what effect on classifier performance can be expected. The temporal variation manager 110 preferably includes a predicted performance analyzer 124 which, in addition to other functions, predicts the effect of increasing the size of the labeled training data set. By estimating any performance gains that might result, the benefits can be traded off against the cost of obtaining the data. FIG. 8 illustrates a preferred method of operation 60 in which predicted performance analyzer 124 carries out this function. As illustrated therein, the future performance predictor method 60 repeatedly performs time-ordered k-fold cross-validation, while varying k and storing the resulting performance estimate (preferably, expected loss at the optimal operation point) as a function of effective training set size. If predicted performance is found to improve with increasing training set size, the results may be extrapolated to estimate the performance benefit likely to result from a given increase in training set size. Conversely, if little or no performance improvement is seen with increasing training set size, additional training data are unlikely to be helpful. Note that in this instance we are considering acquiring additional training data and simply adding them to the previous data. Additional options, such as a moving window, will be considered below.

Turning to the method 60 in more detail, the available labeled training data is first sorted in increasing order of time (step 61) and partitioned into $k=k_1$ subsets of approximately equal size while maintaining the sorted order. As described above, this sorting and partitioning function is carried out by data selection module 111. Time-ordered k-fold cross-validation 116 is performed and the resulting performance estimate 118 stored along with effective training set size $(k-1)/k \cdot n$. The number of subsets, k, is then incremented and the process repeated until k exceeds a chosen upper limit, $k>K_2$.

When the performance estimates for each value of k iterations have been collected, the performance estimates (or summarizing data thereof) may be analyzed and a prediction of future classifier performance may be calculated. Since training set size varies approximately as $(k-1)/k \cdot n$ larger values of k approximate the effects of larger training sets, subject, of course, to statistical variations. By extrapolation, the classifier performance expected with various amounts of additional training data may then be estimated. Extrapolation always carries risk, of course, so such predictions must be verified against actual performance results. Even without extrapolation, however, such a graph will indicate whether or not performance is still changing rapidly with training set size. Rapid improvement in predicted performance with training set size is a clear indication that the training data are not representative of the underlying process, and collection of additional labeled training data is strongly indicated. Such a graph may also be used, with either interpolation or extrapolation, to correct predictions from data sets of different size (e.g., two data sets containing N1 and N2 points respectively) back to a common point of comparison (e.g., correcting predicted performance for the data set containing N2 points to comparable predicted performance for a data set containing N1 points). Correction of this sort increases the likelihood that remaining differences in performance are due to actual variation in the data and not simply artifacts of sample size.

If it is determined that additional labeled training data are to be collected, predicted performance analyzer 124 preferably determines how best to make use of additional collected labeled training data. The additional labeled training data might, for example, be combined with the original set of labeled training data 104 and used during a single training session to train the classifier. Alternatively, the additional labeled training data may be used to periodically train the classifier using subsets of the combined data according to a sliding window scheme. In order to determine how best to use additional labeled training data, predicted performance analyzer 124 can simulate training with a sliding window scheme and can compare the resulting performance estimates with those obtained using all available training data. Such analyses can be conducted either before or after collection of additional training data.

Figure 9:
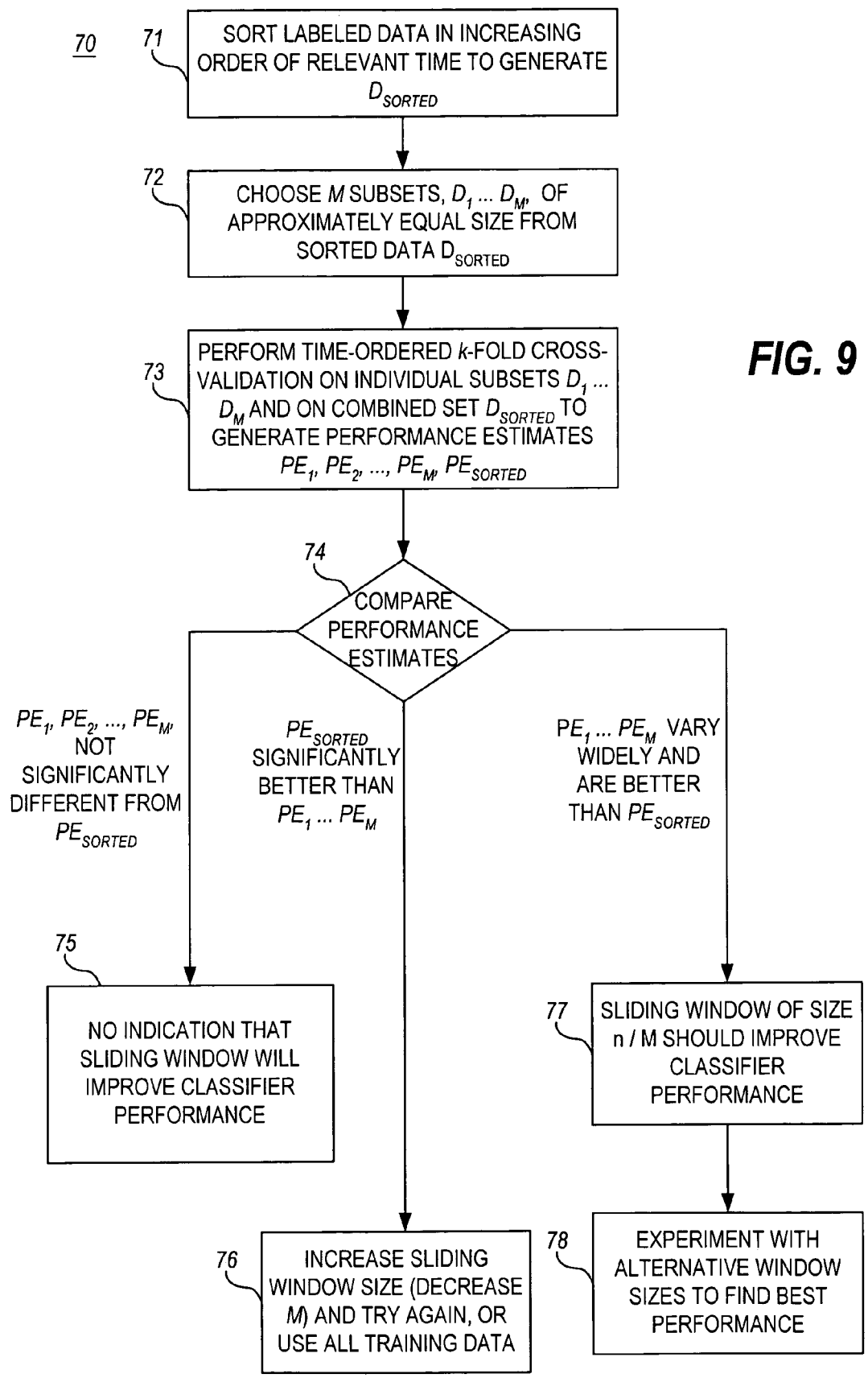
FIG. 9 is a flowchart illustrating a method of operation for determining whether the use of a sliding window into the training data will improve classifier performance.

FIG. 9 illustrates an example method 70 for determining whether the use of a sliding window into the labeled training data will improve classifier performance relative to use of the entire training set. To this end, the training data D are sorted in increasing order of relevant time (step 71) and the sorted labeled training data $D_{SORTED}$ is then partitioned into a number M of subsets $D_1, D_2, \ldots, D_M$, preferably of approximately equal sizes (step 72). These operations are performed by data selection module 111. Conceptually, time-ordered k-fold cross-validation is then performed individually on each of $D_1 \ldots D_M$ simulating sliding windows of size n/M, and the resulting performance estimates compared with results from k-fold cross-validation using the entire data set $D_{SORTED}$. As described previously, in the preferred embodiment, sorting and partitioning operations are carried out in data selection module 111, rather than by the cross-validation module. To perform time-ordered k-fold cross-validation on $D_{SORTED}$, for example, data selection module 111 would deterministically partition $D_{SORTED}$ into k subsets $D_{SORTED\_1} \ldots D_{SORTED\_k}$ while maintaining the sorted order. These subsets are then passed to a generic cross-validation module 116/112 which computes performance estimates without having to perform any additional sorting or partitioning. Similarly, each of $D_1 \ldots D_M$ is individually partitioned into k subsets for processing by the cross-validation module.

Denoting the resulting performance estimates $PE_1 \ldots PE_M$ and $PE_{SORTED}$ respectively, these performance estimates are compared (step 74). Several outcomes are possible. If $PE_1 \ldots PE_M$ vary widely, the window size n/M may be too small and should be increased. Assume these estimates are reasonably consistent. In this case, if $PE_1 \ldots PE_M$ are comparable to $PE_{SORTED}$ there is no indication that use of a sliding window into the training data will improve performance. Conversely, if $PE_1 \ldots PE_M$ are better than $PE_{SORTED}$, use of a sliding window is indicated. Further analysis with varying window size (i.e. changing M) will be used to select the optimal window size. Finally, if $PE_1 \ldots PE_M$ are substantially worse than $PE_{SORTED}$ the sliding window size may be too small. In this case either decrease M and repeat the analysis, or collect additional training data before proceeding.

According to the fourth case when the performance estimates $PE_1, PE_2, \ldots PE_M$ of each of the individual subsets $D_1, D_2, \ldots D_M$ vary widely from one another, there is the possibility of temporal variation in the underlying process that generated the training data samples. In this case, the use of a sliding training window of a different data set size may improve the performance of the classifier. Accordingly, the process 70 may be repeated with various different data set sizes to determine whether an improvement in classifier performance is achievable, and if so, preferably also using a data set size that results in optimal classifier performance.

Figure 10:
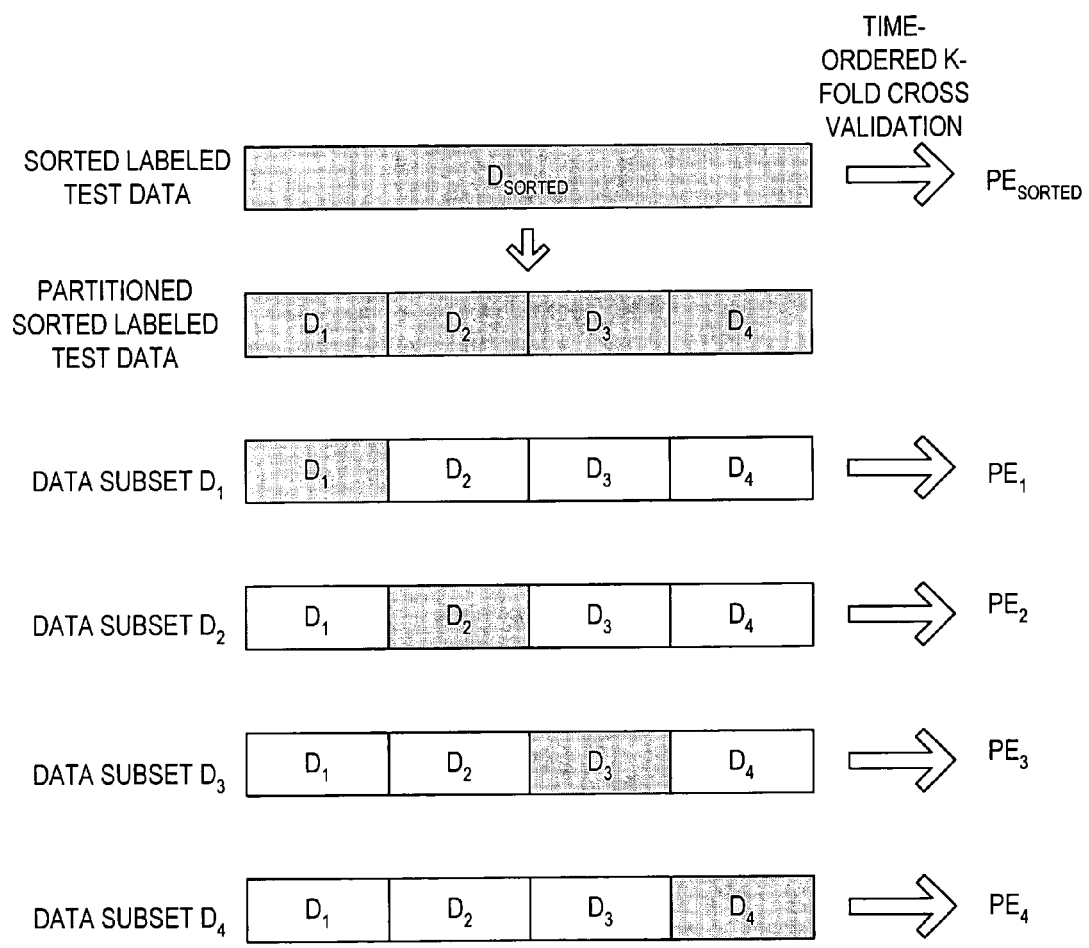
FIG. 10 is a data flow diagram illustrating the use of a sliding window of training data samples when training a classifier according to the method of FIG. 9.

FIG. 10 illustrates schematically the sliding window concept for training a classifier. In the illustrative embodiment, the time-sorted labeled training data $D_{SORTED}$ is partitioned into four mutually exclusive subsets $D_1, D_2, D_3,$ and $D_4$ of approximately equal size (i.e., no member of any subset belongs to any other subset). Ideally, training data should be collected with approximately constant sampling frequency, so that equal sample sizes correspond to approximately equal time durations. The size represents the length in samples of the sliding window into the training data. Thus, a classifier would be trained on subsets $D_1$, then at a latter time on $D_2$, and so on. Optimal size of the window depends on a tradeoff between the need to reflect temporal variation in the underlying process versus the need for a representative number of samples.

Of course, it will be appreciated by those skilled in the art that the number M of subsets may vary according to the particular application, and the subsets may also be constructed to overlap such that one or more subsets includes one or more data samples from a subset immediately previous to or immediately subsequent to the given subset in time. Time-ordered k-fold cross-validation provides a mechanism for choosing the size of such a sliding window to optimize performance.

Figure 11:
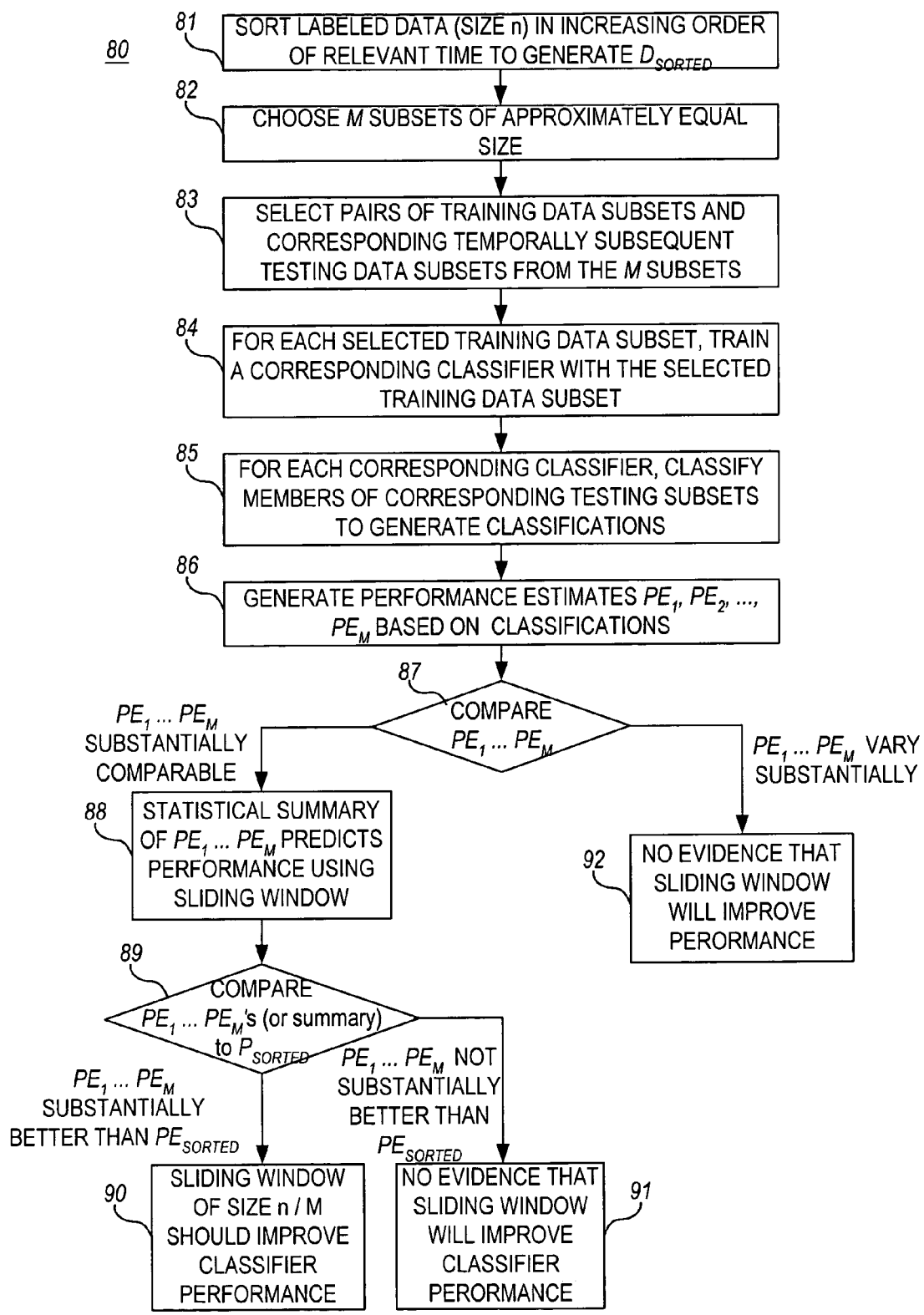
FIG. 11 is a flowchart illustrating an alternative method of operation for determining whether the use of a sliding window of training data samples when training the classifier will improve classifier performance.

FIG. 11 illustrates an alternative example method 80 for determining whether the use of a sliding window into the labeled training data will improve classifier performance relative to use of the entire training set. In this method, the training data D are sorted in increasing order of relevant time (step 81). A number M of subsets $D_1, D_2, \ldots, D_M,$ of approximately equal sizes, are chosen from the sorted labeled training data $D_{SORTED}$, while maintaining the temporal order (step 82). Pairs of training data subsets and corresponding testing data subsets are selected from the M subsets (step 83). The testing data subsets are preferably chosen to be temporally subsequent (treating the data set as circular) and adjacent to their corresponding training data subsets. Again, these operations are preferably performed by data selection module 111. Each chosen training data subset is then used to train a corresponding classifier (step 84), and the corresponding classifier is then used to classify members of its corresponding testing data subset (step 85). Classifications assigned are compared to known true classifications to generate resulting performance estimates (step 86), with an effective sliding window of size n/M. These performance estimates $PE_1 \ldots PE_M$ are compared (step 87).

If $PE_1 \ldots PE_M$ are substantially comparable, their average (or other statistical summary) predicts the performance that would be attained using a sliding window of size n/M (step 88). To determine whether a sliding window will improve performance, it is necessary to compare performance estimated with a sliding window of size n/M to that estimated using the entire data set. Thus substantially comparable performance estimates $PE_1 \ldots PE_M$ or an aggregated summary of them, e.g. their average, would then be compared to the performance estimate $PE_{SORTED}$ generated by a classifier trained over the aggregate time-ordered training data set $D_{SORTED}$ as described above and illustrated in FIG. 9 (step 89). If the comparison from step 89 indicates that the performance estimates $PE_1 \ldots PE_M$, or statistical summary thereof, are substantially better than the performance estimates $PE_{SORTED}$, then training of the classifier using a sliding window of size n/M should result in improved classifier performance (step 90). The process 80 may be repeated with various different data set sizes (n/M) to experiment with the window size to find the size resulting in the best expected performance results).

If the comparison (from step 89) indicates that the performance estimates $PE_1 \ldots PE_M$, or statistical summary thereof, are not substantially better than the performance estimates $PE_{SORTED}$, however, there is no evidence that a sliding window of size n/M will improve the classifier performance (step 91). The process 80 may be repeated with various different data set sizes (n/M) to experiment with the window size in the interest of finding a window size that may improve performance.

Conversely, if it is discovered (in step 87) that the performance estimates $PE_1 \ldots PE_M$ vary substantially, no clear conclusion can be drawn (step 92) (unless the aggregate or other statistical summary of the performance estimates $PE_1 \ldots PE_M$ is substantially different than $PE_{SORTED}$). Such a result may be due to the window size n/M being too small, whereas training using a larger window size may result in more comparable performance estimates $PE_1 \ldots PE_M$. Accordingly, the process 80 may be repeated with various different data set sizes (n/M) to determine whether an improvement in classifier performance is achievable, and if so, preferably also using a window size n/M that results in optimal classifier performance.

Figure 12:
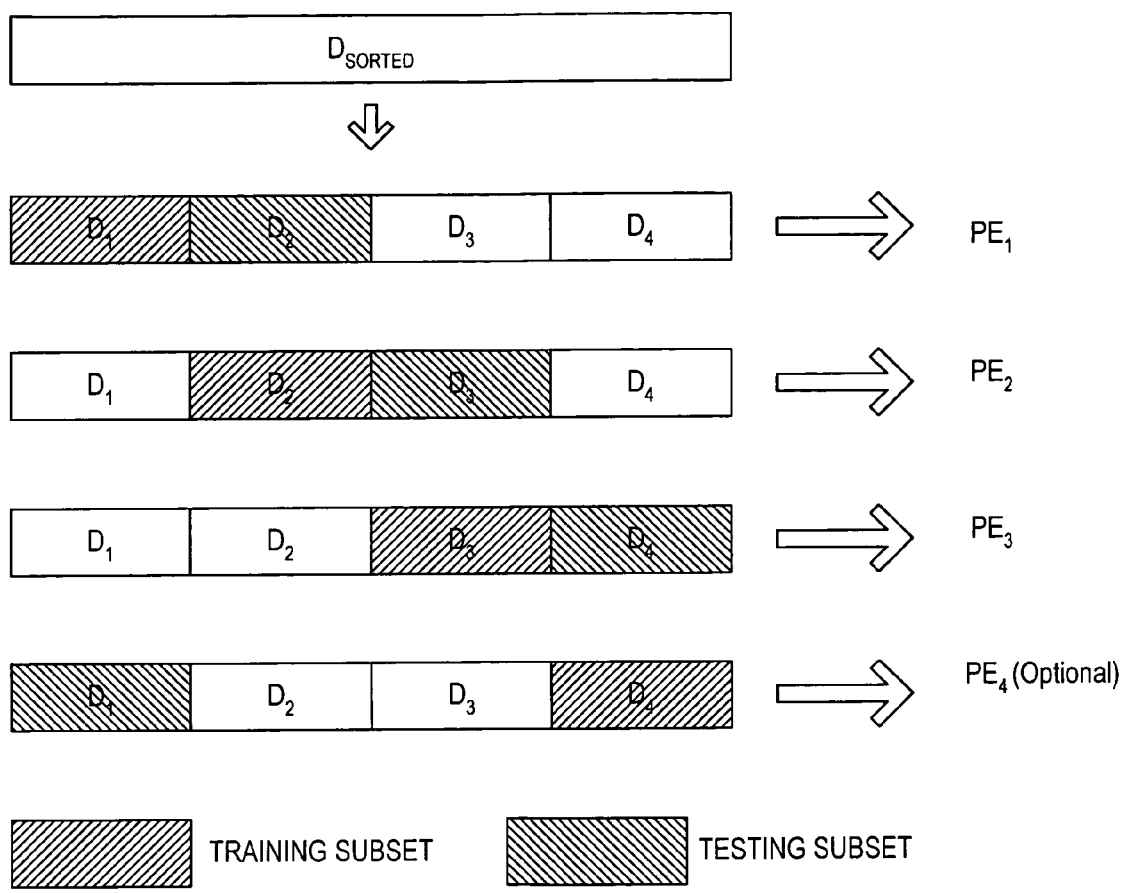
FIG. 12 is a data flow diagram illustrating the use of a sliding window of training data samples when training a classifier according to the method of FIG. 11.

FIG. 12 illustrates schematically the sliding window method of FIG. 11. In the illustrative embodiment, the time-sorted labeled training data $D_{SORTED}$ is partitioned into four mutually exclusive subsets $D_1$, $D_2$, $D_3$, and $D_4$ of approximately equal size. Each subset $D_1$, $D_2$, $D_3$, $D_4$ is used to train a corresponding classifier, and each corresponding classifier is used to classify members of each temporally subsequent subset (in the illustrative embodiment with wraparound) $D_4$, $D_1$, $D_2$, $D_3$. Results from the classifications are used to generate performance estimates $PE_1 \ldots PE_4$. (Note: if one assumes that the time-sorted labeled training data $D_{SORTED}$ is periodic, it may be treated as circular, and hence the temporally subsequent subset for subset $D_4$ would be $D_1$. If one does not assume that the time-sorted labeled training data $D_{SORTED}$ is periodic, performance estimates $P_4$ corresponding to the training/testing subset pair $D_4/D_1$ may be omitted from the analysis.)

As before, training data should be collected with approximately constant sampling frequency, so that equal sample sizes correspond to approximately equal time durations. Of course, it will be appreciated by those skilled in the art that the number M of subsets may vary according to the particular application, and the subsets may also be constructed to overlap such that one or more subsets includes one or more data samples from a subset immediately previous to or immediately subsequent to the given subset in time.

The prior discussion has assumed that a single time suffices to characterize the temporal variation in the process under consideration. This assumption is not always valid. Multiple sources of temporal variation may be introduced, and each source may require its own timestamp for characterization. Time-ordered k-fold cross-validation can readily be extended to handle multiple times. Continuing with the manufacturing example above, suppose that variations in the manufacturing and measurement processes are both important, and each sample is tagged with both the time at which it was fabricated and the time at which it was inspected or measured. Each sample therefore now has two associated times, $t_1$ and $t_2$ corresponding to the time of fabrication and measurement respectively. These can be thought of as orthogonal dimensions in Euclidean space. Sample (training data) points in this example may therefore be imagined as lying in a two-dimensional graph, e.g. with $t_1$ along the x axis, and $t_2$ along the y axis. Assume that the $t_1$ variation has greater influence than $t_2$. (Ties may be broken at random). Split the samples into $k_1$ sets of approximately equal size by choosing breakpoints along the $t_1$ axis. Each of these $k_1$ sets is then further divided into $k_2$ sets of approximately equal size by choosing breakpoints along the $t_2$ axis. This results in $k=k_1 k_2$ rectangular regions, each containing approximately the same number of sample points. As in the one-dimensional case, these regions can each be held out during training, yielding time-ordered $k_1 \times k_2$-fold cross-validation. The same procedure may be readily extended to handle additional dimensions.

Notice that this time-ordered grouping is a valid sample that could arise, albeit with low probability, in the course of conventional k-fold cross-validation. As before, the performance predicted by conventional and time-sorted k-fold cross-validation can be compared to detect evidence of temporal variation, to determine if collection of additional training data is appropriate, and to determine how to best utilize such additional training data.

In summary, the present invention utilizes both conventional and time-ordered k-fold cross-validation to detect and manage some problematic instances of temporal variation in the context of supervised learning and automated classification systems. It also provides tools for predicting performance of classifiers constructed in such situations. Finally, the invention may be used to propose ways to manage the training database and ongoing classifier training to maximize performance in the face of such temporal changes. While the foregoing has been designed for and described in terms of processes which vary in time, it should be appreciated that variation in terms of other variables, e.g. temperature, location, etc., can also be treated in the manner described above.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method for predicting performance of a classifier in printed circuit assembly fabrication, the method comprising:
   receiving a training data set relating to good and defective joints in a printed circuit assembly;
   sorting the training data set into a sorted training data set according to one or more first criteria based at least in part on temporal ordering;
   choosing a plurality of teaching subsets and a corresponding plurality of testing subsets, the teaching subsets being of approximately equal first predetermined size comprising first adjacent members of the sorted training data set, and the testing subsets being of approximately equal second predetermined size comprising at least one member from the sorted training data set that is temporally subsequent to all members of its corresponding one or more teaching subsets;
   training a corresponding plurality of classifiers for classifying good and defective joints with respective ones of the teaching subsets;
   classifying members of the corresponding testing subsets using the corresponding classifiers;
   comparing classifications assigned to members of the corresponding testing subsets to corresponding true classifications of the corresponding members to generate one or more performance estimates; and
   generating a prediction of performance of the a classifier trained using a sliding window into the training data of approximately the first predetermined size using the performance estimates.

2. A computer readable storage medium tangibly embodying program instructions executable on a computer, the program_instructions implementing a method for predicting performance of a classifier trained using a sliding window into a training data set in printed circuit assembly fabrication, the method comprising:
   receiving a training data set relating to good and defective joints in a printed circuit assembly;
   sorting a training data set into a sorted training data set according to one or more criteria based at least in part on temporal ordering;
   choosing a plurality of teaching subsets and a corresponding plurality of testing subsets, the teaching subsets being of approximately equal first_predetermined size comprising first adjacent members of the sorted training_data set, and the testing subsets being of approximately equal second predetermined size comprising at least one member from the sorted training data set that is temporally subsequent to all members of its corresponding one or more teaching subsets;

training a corresponding plurality of classifiers for classifying good and defective joints with respective ones of_the teaching subsets;

classifying members of the corresponding testing subsets using the corresponding classifiers;

comparing classifications assigned to members of the corresponding testing subsets to corresponding true classifications of the corresponding members to generate one or more performance estimates; and generating a prediction of performance of a classifier trained using a sliding window into the training data of approximately the first predetermined size using the performance estimates.

3. A system for predicting performance of a classifier in printed circuit assembly fabrication, the system comprising:

a data selection function which receives a training data set relating to good and defective joints in a printed circuit assembly, and_sorts the training data set into a sorted training data set according to one or more first criteria based at least in part on temporal orderings and which chooses one or more teaching subsets of approximately equal first predetermined size and corresponding one or more testing subsets of approximately equal second predetermined size, the one or more teaching subsets comprising first adjacent members of the sorted training data set, and the one or more testing subsets comprising at least one member from the sorted training data set that is temporally subsequent to all members of its corresponding one or more teaching subsets;

one or more classifiers for classifying good and defective joints that are trained using the one or more teaching subsets respectively and which respectively classify members of the corresponding one or more testing subsets using the corresponding one or more classifiers;

a comparison function which compares classifications assigned to members of the corresponding one or more testing subsets to corresponding true classifications assigned to corresponding members in the labeled training data to generate one or more performance estimates; and a prediction function which generates a prediction of performance of the classifier trained using a sliding window into the training data of approximately the first predetermined size using the performance estimates.

4. A method for predicting performance of a classifier in printed circuit assembly fabrication, the method comprising:

receiving a training data set relating to good and defective joints in a printed circuit assembly;

choosing a plurality of groups of the training data set according to one or more first criteria based at least in part on temporal ordering, the one or more groups being of approximately equal size;

from each of the groups, choosing, based at least in part on temporal_ordering, a plurality of teaching subsets and corresponding testing subsets,_the teaching subsets being of approximately equal first predetermined size,_and the corresponding testing subsets being of approximately equal second predetermined size;

training one or more respective sliding window_classifiers for classifying good and defective joints associated with the respective groups using the corresponding teaching subset of the associated group;

classifying members of the respective testing subsets using the corresponding respective sliding window classifiers;

comparing classifications assigned to members of the corresponding one or more testing subsets to corresponding true classifications assigned to corresponding members in the training data set to generate one or more performance estimates associated with each group; and generating a prediction of performance of the sliding window_classifiers trained using a sliding window of approximately the first predetermined size into the training data set using the performance estimates associated with each group.

5. A computer readable storage medium tangibly embodying program instructions executable on a computer, the program instructions implementing a method for predicting performance of a classifier in printed circuit assembly fabrication, trained using a sliding window into a training data set in printed circuit assembly fabrication, the method comprising:

receiving a training data set relating to good and defective joints in a printed circuit assembly;

choosing one or more groups of the training data set according to one or more first criteria based at least in part on temporal ordering, the one or more groups being of approximately equal size;

from each of the groups, choosing, based at least in part on temporal_ordering, a plurality of teaching subsets and corresponding testing subsets, the teaching subsets being of approximately equal first predetermined size, and the corresponding testing subsets being of approximately equal second predetermined size;

training one or more respective sliding window_classifiers for classifying good and defective joints associated with the respective groups using the corresponding teaching subset of the_associated group;

classifying members of the respective testing subsets using the corresponding respective sliding window classifiers;

comparing classifications assigned to members of the corresponding one or more testing subsets to corresponding true classifications assigned to corresponding members in the training data set to generate one or more performance estimates associated with each group; and generating a prediction of performance of the sliding window_classifiers trained using a sliding window of approximately the first predetermined size into the training data set using the performance estimates associated with each group.

6. A system for predicting performance of a classifier in printed circuit assembly fabrication, the system comprising:

a data selection function which receives a training data set relating to good and defective joints in a printed circuit assembly, and_chooses one or more groups of the training data set according to one or more first criteria based at least in part on temporal ordering, the one or more groups being of approximately equal size, and from each of the groups, chooses, based at least in part on temporal ordering, a plurality of teaching subsets and corresponding testing subsets, the teaching subsets being of approximately equal first predetermined size, and the corresponding testing subsets being of approximately equal first predetermined size;

a plurality of sliding window_classifiers for classifying good and defective joints that are respectively trained using the one or more teaching subsets from each of the one or more groups and which classify members of the corresponding one or more testing subsets;

a comparison function which compares classifications assigned to members of the corresponding one or more testing subsets to corresponding true classifications assigned to corresponding members in the labeled training data to generate one or more performance estimates associated with each group; and a prediction function which generates a prediction of performance of the sliding window classifiers trained using a sliding window of approximately the first predetermined size into the training data set using the one or more performance estimates associated with each group.

7. The method of claim 4, further comprising:

choosing, based at least in part on temporal ordering, a plurality of composite teaching subsets and corresponding composite testing subsets from the entire sorted training data set;

training a composite classifier associated with the entire sorted training data set using the composite teaching subset;

classifying members of the composite testing subset using the corresponding composite classifier;

comparing classifications assigned to members of the composite subset to corresponding true classifications assigned to corresponding members in the training data set to generate one or more performance estimates associated with the composite classifier;

generating a prediction of performance of the composite classifier;

comparing the predictions of performance of the sliding window classifiers with the prediction of performance of the composite classifier; and generating an indication of which of the sliding window classifiers or the composite classifier is predicted to perform better.

8. The computer readable storage medium of claim 5, the method further comprising:

choosing, based at least in part on temporal ordering, a plurality of composite teaching subsets and corresponding composite testing subsets from the entire sorted training data set;

training a composite classifier associated with the entire sorted training data set using the composite teaching subset;

classifying members of the composite testing subset using the corresponding composite classifier;

comparing classifications assigned to members of the composite subset to corresponding true classifications assigned to corresponding members in the training data set to generate one or more performance estimates associated with the composite classifier;

generating a prediction of performance of the composite classifier;

comparing the predictions of performance of the sliding window classifiers with the prediction of performance of the composite classifier; and generating an indication of which of the sliding window classifiers or the composite classifier is predicted to perform better.

* * * * *

UNITED STATES PATENT AND TRADEMARK OFFICE
CERTIFICATE OF CORRECTION

PATENT NO. : 7,373,332 B2
APPLICATION NO. : 10/940441
DATED : May 13, 2008
INVENTOR(S) : Heumann et al.

It is certified that error appears in the above-identified patent and that said Letters Patent is hereby corrected as shown below:

In column 16, line 53, in Claim 2, delete "program_instructions" and insert -- program instructions --, therefor.

In column 16, line 64, in Claim 2, delete "first_predetermined" and insert -- first predetermined --, therefor.

In column 16, lines 65-66, in Claim 2, delete "training_data" and insert -- training data --, therefor.

In column 17, line 6, in Claim 2, delete "of_the" and insert -- of the --, therefor.

In column 17, line 22, in Claim 3, delete "and_sorts" and insert -- and sorts --, therefor.

In column 17, line 59, in Claim 4, delete "temporal_ordering" and insert -- temporal ordering --, therefor.

In column 17, line 60, in Claim 4, delete "subsets,_the" and insert -- subsets, the --, therefor.

In column 17, line 62, in Claim 4, delete "size,_and" and insert -- size, and --, therefor.

In column 17, lines 64-65, in Claim 4, delete "window_classifiers" and insert -- window classifiers --, therefor.

In column 18, line 11, in Claim 4, delete "window_classifiers" and insert -- window classifiers --, therefor.

In column 18, line 29, in Claim 5, delete "temporal_ordering" and insert -- temporal ordering --, therefor.

In column 18, lines 34-35, in Claim 5, delete "window_classifiers" and insert -- window classifiers --, therefor.

In column 18, line 37, in Claim 5, delete "the_associated" and insert -- the associated --, therefor.

UNITED STATES PATENT AND TRADEMARK OFFICE
CERTIFICATE OF CORRECTION

PATENT NO. : 7,373,332 B2
APPLICATION NO. : 10/940441
DATED : May 13, 2008
INVENTOR(S) : Heumann et al.

It is certified that error appears in the above-identified patent and that said Letters Patent is hereby corrected as shown below:

In column 18, line 48, in Claim 5, delete "window_classifiers" and insert -- window classifiers --, therefor.

In column 18, line 56, in Claim 6, delete "and_chooses" and insert -- and chooses --, therefor.

In column 18, line 66, in Claim 6, delete "window_classifiers" and insert -- window classifiers --, therefor.

Signed and Sealed this

Second Day of September, 2008

JON W. DUDAS
*Director of the United States Patent and Trademark Office*